(12) United States Patent
Huynh et al.

(10) Patent No.: US 9,213,539 B2
(45) Date of Patent: Dec. 15, 2015

(54) SYSTEM HAVING A BUILDING CONTROL DEVICE WITH ON-DEMAND OUTSIDE SERVER FUNCTIONALITY

(75) Inventors: Cuong Huynh, Renton, WA (US); Mark Behar, Redmond, WA (US); Stuart Donaldson, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 794 days.

(21) Appl. No.: 12/977,701

(22) Filed: Dec. 23, 2010

(65) Prior Publication Data

US 2012/0166992 A1 Jun. 28, 2012

(51) Int. Cl.
| | |
|---|---|
| G06F 21/50 | (2013.01) |
| G06F 15/16 | (2006.01) |
| G06F 3/048 | (2013.01) |
| G06F 9/44 | (2006.01) |
| H04L 12/28 | (2006.01) |

(52) U.S. Cl.
CPC ............. G06F 8/70 (2013.01); H04L 12/2803 (2013.01); H04L 12/2818 (2013.01); H04L 2012/2841 (2013.01)

(58) Field of Classification Search
CPC ............ H04L 12/2803; H04L 12/2818; H04L 2012/2841
USPC .......................... 715/771; 702/184; 340/12.32
See application file for complete search history.

(56) References Cited

U.S. PATENT DOCUMENTS

| | | | |
|---|---|---|---|
| 4,375,637 A | 3/1983 | Desjardins | |
| 4,816,208 A | 3/1989 | Woods et al. | |
| 5,042,265 A | 8/1991 | Baldwin et al. | |
| 5,161,387 A | 11/1992 | Metcalfe et al. | |
| 5,385,297 A | 1/1995 | Rein et al. | |
| 5,390,206 A | 2/1995 | Rein et al. | |
| 5,768,119 A | 6/1998 | Havekost et al. | |
| 5,815,086 A * | 9/1998 | Ivie et al. | 340/12.52 |
| 5,929,761 A | 7/1999 | Van der Laan et al. | |
| 5,946,303 A | 8/1999 | Watson et al. | |
| 5,955,946 A | 9/1999 | Beheshti et al. | |
| 6,124,790 A | 9/2000 | Golov et al. | |
| 6,178,362 B1 | 1/2001 | Woolard et al. | |
| 6,185,483 B1 | 2/2001 | Drees | |

(Continued)

FOREIGN PATENT DOCUMENTS

| | | |
|---|---|---|
| WO | WO 01/97146 | 12/2001 |
| WO | WO 02/052432 | 7/2002 |

(Continued)

OTHER PUBLICATIONS

Honeywell, "Excel Building Supervisor-Integrated R7044 and FS90 Ver. 2.0," Operator Manual, 70 pages, Apr. 1995.

(Continued)

*Primary Examiner* — Jordany Nunez

(74) *Attorney, Agent, or Firm* — Seager, Tufte & Wickhem LLC

(57) ABSTRACT

A system having a building control device with on-demand outside server functionality. It may have a building control device connected to a thin user interface client and/or a rich client user interface. The building control device may be connected to an external server from a computing cloud environment to extend the functionality, storage and processing, among other things, of the building control device.

2 Claims, 7 Drawing Sheets

(56) References Cited

U.S. PATENT DOCUMENTS

| | | | |
|---|---|---|---|
| 6,223,544 B1 | 5/2001 | Seem | |
| 6,295,526 B1 | 9/2001 | Kreiner et al. | |
| 6,295,527 B1 | 9/2001 | McCormack et al. | |
| 6,314,328 B1 | 11/2001 | Powell | |
| 6,351,213 B1 | 2/2002 | Hirsch | |
| 6,356,282 B2 | 3/2002 | Roytman et al. | |
| 6,420,968 B1 | 7/2002 | Hirsch | |
| 6,430,712 B2 | 8/2002 | Lewis | |
| 6,473,407 B1 | 10/2002 | Ditmer et al. | |
| 6,492,901 B1 | 12/2002 | Ridolfo | |
| 6,535,122 B1 | 3/2003 | Bristol | |
| 6,549,135 B2 | 4/2003 | Singh et al. | |
| 6,675,591 B2 | 1/2004 | Singh et al. | |
| 6,681,156 B1 | 1/2004 | Weiss | |
| 6,690,980 B2 | 2/2004 | Powell | |
| 6,813,587 B2 | 11/2004 | McIntyre et al. | |
| 6,816,811 B2 | 11/2004 | Seem | |
| 6,870,141 B2 | 3/2005 | Damrath et al. | |
| 6,879,253 B1 | 4/2005 | Thuillard | |
| 6,892,546 B2 | 5/2005 | Singh et al. | |
| 6,919,809 B2 | 7/2005 | Blunn et al. | |
| 6,947,972 B2 | 9/2005 | Chun | |
| 6,955,302 B2 | 10/2005 | Erdman, Jr. | |
| 6,973,627 B1 | 12/2005 | Appling | |
| 6,990,821 B2 | 1/2006 | Singh et al. | |
| 7,024,283 B2 | 4/2006 | Bicknell | |
| 7,062,389 B2 | 6/2006 | Johnson et al. | |
| 7,068,931 B2 | 6/2006 | Tokunaga | |
| 7,069,181 B2 | 6/2006 | Jerg et al. | |
| 7,085,674 B2 | 8/2006 | Iwasawa | |
| 7,113,085 B2 | 9/2006 | Havekost | |
| 7,171,287 B2 | 1/2007 | Weiss | |
| 7,243,044 B2 | 7/2007 | McCalla | |
| 7,250,856 B2 | 7/2007 | Havekost et al. | |
| 7,277,018 B2 | 10/2007 | Reyes et al. | |
| 7,345,580 B2 | 3/2008 | Akamatsu et al. | |
| 7,457,869 B2 | 11/2008 | Kernan | |
| 7,460,020 B2 | 12/2008 | Reyes et al. | |
| 7,596,613 B2 | 9/2009 | Silverthorne et al. | |
| 7,653,459 B2 | 1/2010 | Pouchak et al. | |
| 7,743,042 B2* | 6/2010 | Kim | 707/705 |
| 7,819,334 B2 | 10/2010 | Pouchak et al. | |
| 7,826,929 B2 | 11/2010 | Wacker | |
| 8,699,501 B2* | 4/2014 | Shin et al. | 370/401 |
| 2002/0011923 A1* | 1/2002 | Cunningham et al. | 340/310.01 |
| 2002/0022991 A1* | 2/2002 | Sharood et al. | 705/14 |
| 2002/0073411 A1* | 6/2002 | Tsunedomi et al. | 717/171 |
| 2003/0101009 A1 | 5/2003 | Seem | |
| 2003/0171851 A1 | 9/2003 | Brickfield et al. | |
| 2004/0016243 A1* | 1/2004 | Song et al. | 62/132 |
| 2004/0143510 A1 | 7/2004 | Haeberle et al. | |
| 2005/0038571 A1 | 2/2005 | Brickfield et al. | |
| 2005/0043862 A1 | 2/2005 | Brickfield et al. | |
| 2005/0080879 A1* | 4/2005 | Kim et al. | 709/219 |
| 2005/0125083 A1* | 6/2005 | Kiko | 700/19 |
| 2005/0193285 A1 | 9/2005 | Jeon | |
| 2005/0203490 A1 | 9/2005 | Simonson | |
| 2006/0095339 A1* | 5/2006 | Hayashi et al. | 705/26 |
| 2006/0136558 A1 | 6/2006 | Sheehan et al. | |
| 2006/0168013 A1 | 7/2006 | Wilson et al. | |
| 2006/0253205 A1 | 11/2006 | Gardiner | |
| 2007/0209006 A1* | 9/2007 | Arthurs et al. | 715/733 |
| 2007/0211762 A1* | 9/2007 | Song et al. | 370/490 |
| 2007/0268121 A1* | 11/2007 | Vasefi et al. | 340/506 |
| 2008/0010049 A1 | 1/2008 | Pouchak et al. | |
| 2008/0016493 A1 | 1/2008 | Pouchak et al. | |
| 2008/0046539 A1* | 2/2008 | Lee et al. | 709/217 |
| 2008/0115153 A1 | 5/2008 | Brindle | |
| 2008/0125914 A1 | 5/2008 | Wacker | |
| 2008/0270562 A1* | 10/2008 | Jin et al. | 709/208 |
| 2009/0113037 A1 | 4/2009 | Pouchak | |
| 2009/0235243 A1* | 9/2009 | Jung et al. | 717/168 |
| 2010/0031177 A1* | 2/2010 | Reed et al. | 715/771 |
| 2010/0069056 A1* | 3/2010 | Pope et al. | 455/419 |
| 2010/0100583 A1 | 4/2010 | Pouchak | |
| 2010/0106543 A1 | 4/2010 | Marti | |
| 2010/0131653 A1 | 5/2010 | Dharwada et al. | |
| 2010/0131877 A1 | 5/2010 | Dharwada et al. | |
| 2010/0287130 A1 | 11/2010 | Guralnik et al. | |
| 2010/0332617 A1* | 12/2010 | Goodwin et al. | 709/219 |
| 2011/0010654 A1 | 1/2011 | Raymond et al. | |
| 2012/0110158 A1* | 5/2012 | Koch et al. | 709/223 |
| 2012/0166992 A1* | 6/2012 | Huynh et al. | 715/771 |
| 2014/0053260 A1* | 2/2014 | Gupta et al. | 726/22 |
| 2014/0248802 A1* | 9/2014 | Hieda et al. | 439/620.01 |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Trane, "System Programming, Tracer Summit Version 14, BMTW-SVP01D-EN," 623 pages, 2002.
Adobe Acrobat 6.0 Standard, Version 6.0.2, Screenshots, 2 pages, May 18, 2004.
U.S. Appl. No. 12/643,865, filed Dec. 21, 2009.
U.S. Appl. No. 12/703,476, filed Feb. 10, 2010.
U.S. Appl. No. 12/722,364, filed Mar. 11, 2010.
U.S. Appl. No. 12/792,547, filed Jun. 2, 2010.
U.S. Appl. No. 12/822,997, filed Jun. 24, 2010.
Honywell Spyder Bacnet User's Guide, 242 pages, Revised Jul. 2009.
Hoeywell Spyder User's Guide 202 pages, Released Jul 2007.
http://blogs.msdn.com/b/khen1234/archive/2005/05/11/416392.aspx, "Regular Expressions in T-SQL," 4 pages, May 11, 2005.
http://en.wikipedia.org/wiki/JAR_(file_format), "JAR (file Format)—Wikipedia, the Free Encyclopedia," 3 pages, printed Dec. 26, 2009.
http://www.google.com/maps, "Google Maps, Pin Location," 1 page, prior to Nov. 21, 2008.
Microsoft Word Screen Shots, 2 pages, prior to Nov. 21, 2008.
Siemens, BACnet for DESIGO 27 Pages, prior to Dec. 30, 2009.
Tridium, "NiagaraAX Product Model Overview," 7 pages, 2005.
Tridium, "Tridium & Niagara Framework Overview," 9 pages, prior to Oct. 28, 2008.

* cited by examiner

SYSTEM HAVING A BUILDING CONTROL DEVICE WITH ON-DEMAND OUTSIDE SERVER FUNCTIONALITY

BACKGROUND

The invention pertains to controls and particularly to building control devices. More particularly, the invention pertains to enhancing building control devices.

SUMMARY

The invention is a system having a building control device with on-demand outside server functionality. It may have a building control device connected to a thin user interface client and/or a rich client user interface. The building control device may be connected to an external server from a computing cloud environment to extend the functionality, storage and processing, among other things, of the building control device.

DESCRIPTION

Figure 1:
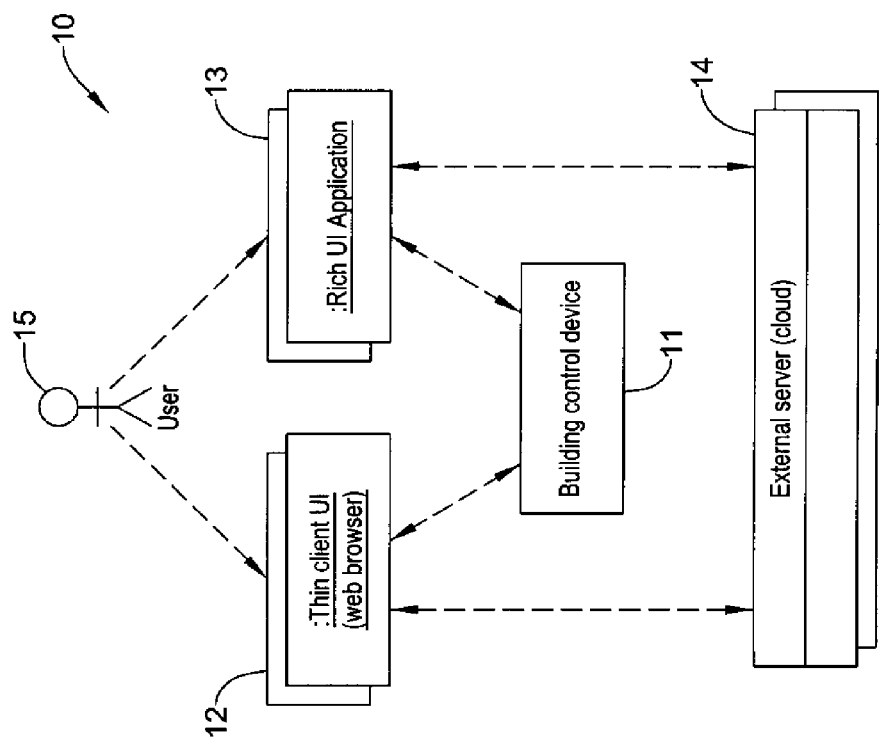
FIG. 1 is a block diagram of the present system.

A key need of a building control system is access to long-term history data for diagnostics and system performance analysis, e.g., trend log and alarm history, and fault detection analysis. This access may be a functionality typically provided by the supervisor device in the building control system, including embedded devices in some cases. However, when an embedded device is used for this supervisor role, a key limitation the customers have in using it for that role may be storage capacity for history data, and raw CPU for data analysis functionality.

These limitations are not necessarily and easily solved without adding a high-end server to the system. Such solution may increase the huge cost to the system and require a totally different physical installation. Both of these changes appear to go against the selling points of an embedded supervisor controller, which is of small physical footprint and low cost. The present approach may provide a solution by utilizing the computing cloud environment as an optional server of the building control embedded device for both data storage and functionality.

A client-server solution requiring at least one high-power device (e.g., high-end PC) dedicated to be a server is not necessarily good. The present approach instead may make use of a server in a such a way in that the server or a cluster of servers are used only optionally when the customer finds the need for getting the additional functionality, and the effort for customer making the switch to get additional functionality is easy.

The cloud computing environment may fit well into the present approach because it has the capacity to provide on-demand server functionality. The industry trend may also be moving in a direction that would make it feasible for the present approach to have a user-deployable server software component to the computing cloud (e.g., Google App Engine or Amazon EC2) provided that the customer is willing to sign up for the service. A remaining piece of the present approach could include an application (app) based on a design that integrates an optional functionality perceived by the users to be in their embedded device, but instead the functionality is through the optional computing cloud.

The present approach may be applied in an embedded building control supervisor device based on the following design outline. The application may be partitioned into client and server systems. The client may provide an application's user interface (UI) via the current standard web technology, e.g., it may run inside current PC browser supporting HTML/CSS/Javascript. The server by default may be the embedded supervisor device. The application user interface (e.g., main menu or tab menu in web user interface) might be extended via a very small downloadable plug-in. For instance, a plug-in may be added to enable a user to access a menu "view archived trend log data", as described herein.

The server may be designed in a way that it recognizes requests from the client's user interface (e.g., view archive trendlog data), and be part of the extended/optional functionality processed by the optional server in the computing cloud. In such case, the server may simply route the request to the computing cloud server, and route the response back to the original requester. Requests of this type may fall into two major categories. One, an initial feature requested through the UI may end up as a standard web page or page subset content corresponding to the UI of that feature, or client component of the application feature, e.g., a complete HTML/CSS/Javascript that comprises the UI and logics for the "view archived trendlog data" feature. Another category may be data access/update or action requests from the UI in the client; e.g., the requests made from the logics of the "view archived trendlog data".

A sign-up feature may be available via the embedded device's UI, where the user can request and be walked through to easily setup the embedded device for the optional feature. The setup may include steps such as connecting to a solution provider's predefined server on the Internet, and selecting additional service to be integrated into the embedded device. For instance, Alerton's BCM-WEB embedded supervisor device might connect to a predefined web site address and download a list of optional application features available for BCM-WEB via computing cloud platform, and get the following list back of "view archived trend log", "view archived alarms", and so forth.

The embedded device should provide a method of indirectly transferring data potentially needed by the optional feature in the virtual computing server, using a standard method instead of directly talking to the server. An example may be transferring an archiving trend log and alarm records through the embedded device's history data archiving via SMTP (simple mail transfer protocol) emailing based on a configurable policy.

A diagram may summarize a solution for scalable embedded building control supervisor device, especially embedded device with limited footprint. The solution may enable additional functionality and plug-in applications from an external server to be added to a building control system.

There are primarily three major areas of extensions provided by the plug-in functionality, and are intended to be options available for incorporating to specific product solutions as applicable. First, plug-in application functionality may be provided mostly by the external server's views, which also gets data from the external server such as archived data or analysis data performed by the server. Second, a plug-in functionality may be provided through an optionally downloaded replacement of an application data service in the building control device, with an enhancement provided by merging current data within the building control device (related to time-based or history data such as a trend log) with older/archived data from the configured external server as part of the plug-in extension. Third, a plug-in functionality may be provided through additional download data service (or application service) modules in the building control device for those services designed to be processed collaboratively by a list of registered handlers. (E.g., service request inputs may be specified in a document based style similar to XML with separate sections designed to be processed by different registered handlers that recognize the input, and results may also be separated in different sections combined from output of different registered handlers.)

FIG. 1 is a diagram of the system context of the present approach. System 10 may have the following key devices and hosts/servers. The building control device 11 may be a key part of the system that provides building control supervisor functionality (e.g., building automation control monitoring and configuration functionality), and optionally controlling functionality, e.g., actually controlling building equipment. The thin client UI 12 (i.e., thin UI client) may provide user interaction with the building control system through a web browser supporting standard HTML/Javascript/CSS, i.e., no browser's native platform plug-in components as in a Rich UI application 13 (i.e., rich client UI). The Rich UI application 13 may be similar to the thin client UI 12 in terms of providing interface and interaction of a user 15 with the building control device 11, but in a much more sophisticated UI typically available only through desktop UI applications, or a web browser with plug-ins like Silverlight or Flash. It may typically fetch data and render its own contents rather than relying on the building control device 11 to generate the web page content.

As described further herein, the plug-in applications extensibility scenario introduced herein may take place primarily in the UI and an external server (cloud) 14. For other extensibility related to scenarios 2 and 3, the functionality may be distributed in virtually all layers of hosts, including an extension to the building control device 11.

Figure 2:
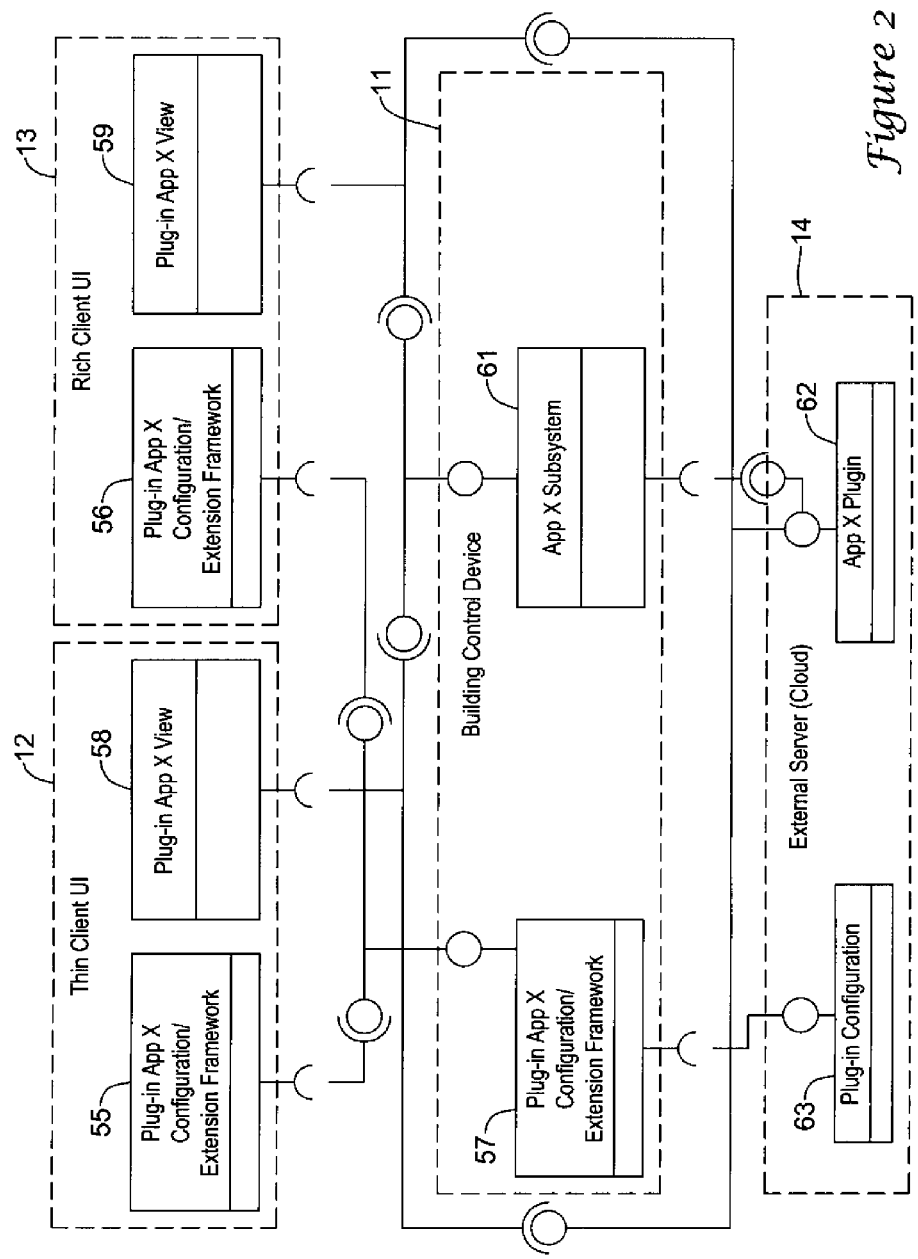
FIG. 2 is a schematic diagram of the present system.

FIG. 2 is a diagram of a system like that in FIG. 1 but with additional detail. Thin client plug-in app X configuration/extension framework 55 of thin client UI 12 or a plug-in app X configuration/extension framework 56 of rich client UI 13, may be connected to a plug-in app X configuration/extension framework 57 of building control device 11. Plug-in app X view 58 or plug-in app X view 59 of rich client UI 59, may be connected to app X subsystem 61 of building control device 11, and app X plug-in 62 of the external server 14. Plug-in app X configuration/extension framework 57 may be connected to a plug-in configuration (config) 63 of external server 14.

Key subsystems or components of an external server (cloud) may enable a building control device's functionality to be extended through the external cloud server 14. A plug-in configuration may provide functionality for signing up and accessing the current list of configured plug-in applications for a specified building control device. E.g., an implementation of this might include a database of optional features available for each corresponding building control device identified by some unambiguous means. Also, it might include a database of features signed up by each specific building control device identified by an unambiguous identifier.

An App X Plug-in may provide additional application views (e.g., Plug-in App X View) for building control device. E.g., Trend log data analysis view that gets its data from the external server based on archived trend log data. App X Plug-in may also provide additional data for the Plug-in App X View. E.g., archived history data from building control device, or analysis data produced from the building control device's history data.

Key subsystems or components of a building control device may enable its functionality to be extended through the external cloud server and thin client UI and/or rich client UI. A plug-in app configuration/extension framework may provide functionality including views for configuring a list of plug-in applications available for a specified building control device. This subsystem may communicate with a corresponding subsystem in the external server (cloud) for its configuration functionality. As a result of the plug-in application configuration, the list of the applications available for a building control device may include the additional plug-in applications. These additional menu entries and information (info) on how to access each of these may be provided by this Plug-in App Configuration subsystem, which could be accessed by other subsystems of building control device such as a Web UI to build its menu. Similarly, the rich client UI could access this subsystem (e.g., through web service) to get the plug-in application views' menu entries and associated plug-in components to integrate into its runtime. It may optionally provide proxy service which takes requests related to a Plug-in App from client (which could be a thin client UI or rich client UI) and dispatches to the external server (cloud) and returns results back to the client.

An App X Subsystem may provide application features in the building control device, which could be extended and could include among others the following. An App X View may be one of the building control device applications' view; e.g., Trend log data. App X Data may provide application's processing/data service (including persistence store). It may be an optional component, but typically needed for each building application feature; e.g., alarm history or trendlog history data. App X Data Archiving may be part of the application X's feature related to history data archiving. E.g., trend log data older than n days (as an example of an archive period) would be archived in the configured external server. This component could be optionally downloaded in a scalable system solution as part of Plug-in App X Configuration's processing.

The key subsystems or components of a thin client UI that enables a building control device's functionality to be extended through its user interface and the external cloud server may include the following items. A Plug-in App Configuration/Extension Framework may provide application functionality/features extension signup. E.g., this could simply be a menu entry that opens a web page from the external cloud (server). It may integrate the signed-up plug-in applications into its menu access.

A Plug-in App X View may display the plug-in application X's view specific contents and include the following special characteristics. This view may be generated by the corresponding plug-in App X View from the external server (cloud), or as an alternative by the building control device if it chooses to provide the Plug-in App by downloading the extension component to its list of components as part of the sign up process/configuration. This view may make a request for data by directly interacting with the external server (cloud) or as an alternative indirectly through the building control device, which acts as a proxy server; i.e., route requests from client to external server (cloud) and responses from external server to client.

The key subsystems or components of a rich client UI that enables the building control device's functionality to be extended through its user interface and the external cloud server may include the following: A Plug-in App Configuration/Extension Framework may provide application functionality extension sign up. E.g., this could simply be a menu entry that opens a web page from external cloud (server). It may integrate the signed-up plug-in applications into its menu access. For plug-in applications requiring additional components to be loaded in the rich client UI, one may dynamically load and initialize these components as one solution for integrating these optional application features component into the rich client UI.

A Plug-in App X View may display the plug-in application X's view specific contents and include the following special characteristics. This view may be provided by a dynamically loaded component corresponding to one of the sign-up extension application features. In some cases, although less typical of rich client UI features, this could be corresponding to an embedded web page displayed by a common web page view component of the rich client UI. This view may make a request for data by directly interacting with the external server (cloud) or as an alternative indirectly through the building control device, which acts as a proxy server; i.e., route requests from client to external server (cloud) and responses from the external server to the client.

Figure 3:
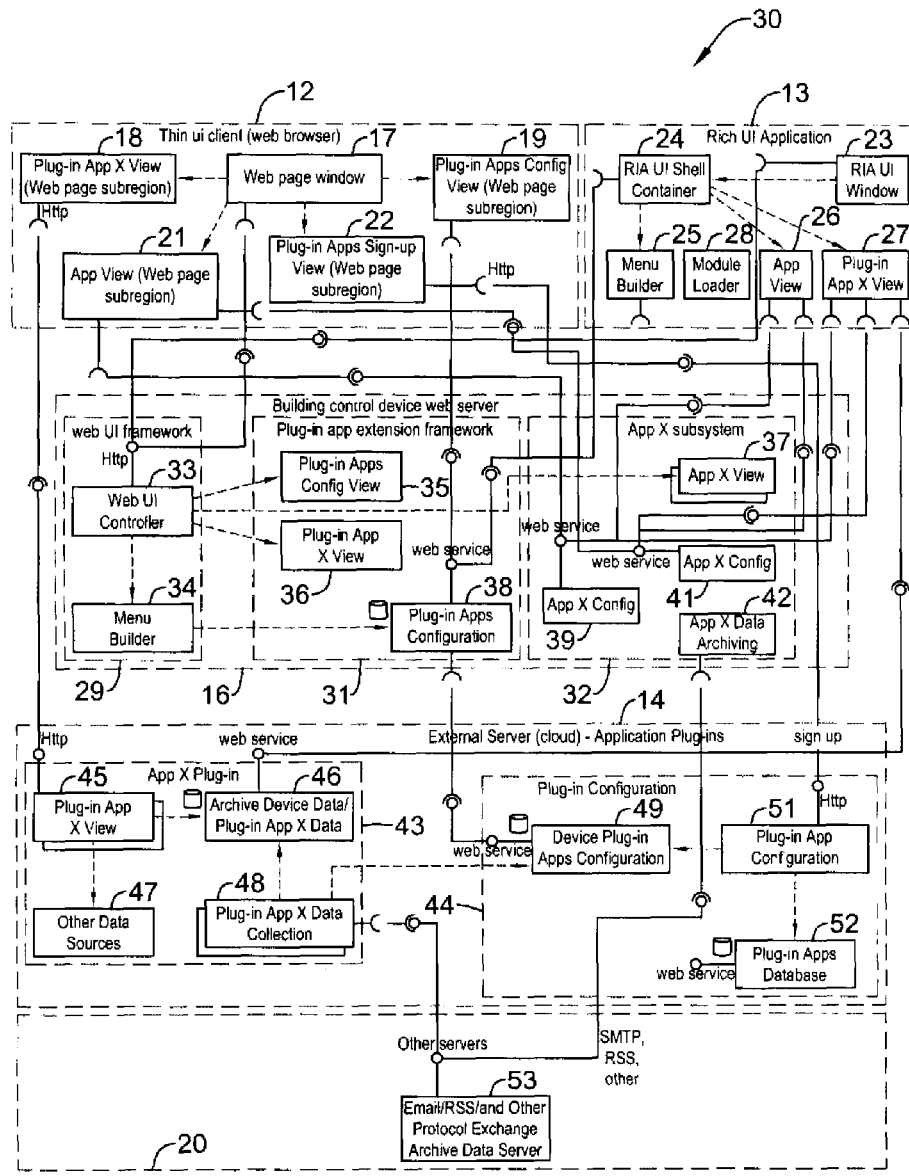
FIG. 3 is a more detailed diagram of the present system.

A view of the present approach is shown in a diagram of FIG. 3. An external server (cloud) 14 may enable a building control device's available application functionality to be extended and improved as selective options for the user 15 of a building control system. The cloud 14 may involve plug-in applications.

A plug-in application (app) configuration 51 may provide functionality for signing up and accessing the current list of configured plug-in applications for a specified building control device 11 (FIGS. 1 and 2). A plug-in applications database 52 may contain a list of available plug-in applications associated with each device category (e.g., a specific device model and version number). This might include actual modules as part of the plug-in modules to be downloaded as part of the plug-in app configuration 51 by the remote building control device. A device plug-in apps configuration 49 may provide a persistent configuration of plug-in application currently licensed/available associated with a building control device identifier (such as device's MAC or other type of manufacturer's assigned host ID).

A plug-in app X view 45 may provide enhanced or additional application X's views for building control device 11. An example may be a trend log data analysis view that gets its data from the external server 14 based on archived trend log data. Other data sources may provide additional data for the plug-in app X view 45. An example may be for features requiring data analysis and comparison related to energy consumption; the other data sources could provide similar building energy consumption profiles from external data sources for comparison (based on different normalization criteria, similar size, age, and so forth).

Archive device data/plug-in app X data 46 may provide building control data, possibly designed with a schema that can store data for multiple application features. An example may be archived device data such as trend log or alarm history data. The archived device data may be part of a multi-tenancy server solution, where each building control device's data are treated similar to a tenant in a typical multi-tenancy software design solution.

Plug-in app X data collection 48 may be a counter part of app X data archiving 42 in web server 16 of the building control device 11. The key functionality may be to collect and store archive data transferred indirectly through other servers 20 (e.g., an Email server). Authorized access information associated with app X data 41 may be configured through the plug-in apps configuration 38 in the building control device's plug-in app extension framework 31.

Other servers 20 such as Email/RSS/other protocol exchange archive data servers may provide a standard mechanism for building control device 11 to transfer data indirectly to the external server (cloud) 14, e.g., archiving trend log data via emailing to an external email server. It may be noted that this may be part of the incremental steps for enhancing the functionality of building control embedded device. First, it enables the users of the system to archive its data to a server like an SMTP email server that the users already have. If users of a user interface of the system find the need to make the use of the archived data easy like viewing or getting additional analysis data, they can sign-up to get access to the optional functionality from the external server (cloud) 14.

The building control device web server 16 may be noted. A web UI framework may provide a common web UI framework 29 from which specific views are derived, including common view contents like the web UI page logo, menu, and so forth. A specific view may typically be rendered in the remaining or allocated main area of the page. In addition, it may also provide the file request service for serving up requested application modules for a (Rich Internet application (RIA)) rich UI application 13.

Web UI framework (controller) 29 may provide the typical controller functionality similar to a standard model view controller (MVC) pattern. It may process web browser requests (URLs) corresponding to web UI view requests by dispatching to the view chained action handlers associated with the specific URL. A result may be an HTML page content as a response to the web browser request. In addition, it may also provide a general file request service for serving up files, including application modules for the rich client UI 13.

A menu builder 25 may generate the web application view page contents specifically in a region corresponding to the application menu contents. For the scalability system being described, menu builder 25 may contain at least a menu entry for configuring plug-in applications, and a list of menu entries corresponding to the plug-in applications available as result of the menu entry for configuring plug-in applications. As part of the MVC framework, the menu builder 25 may typically be one of the chained action handlers corresponding to a URL request handler for a thin UI client 12 view.

A plug-in app extension framework 31 may provide functionality including views for configuring a list of plug-in applications available for a specified building control device 11. A plug-in apps configuration view 38 may enable a user 15 (FIG. 1) to provide inputs related to the external server (cloud) 14 access info (e.g., authentication key, user, and password), which are obtained from the plug-in apps sign-up view 22 output or similar info obtained from purchasing through the device's manufacturer.

A plug-in apps configuration subsystem may provide the functionality for (a) configuring the current device's available plug-in applications based on the inputs from the plug-in apps configuration view, and (b) retrieving a list of active plug-ins available for the current building control devices 11.

The configuration functionality may be provided through a web service, which supports both thin UI client 12 and Rich UI application 13. The functionality may include the following key aspects. One aspect is initializing the list of available plug-in application and access information (info). The configuration web service may take input parameters related to those required for communicating with the external server 14 providing the plug-in applications, such as URL and authentication parameters. (These parameters for example may be provided as result of the plug-in apps sign-up view 22.) Given the input, the configuration service may request from an external server's device plug-in apps configuration the list of active plug-in applications, and associated info for accessing each of them. For example, access info may be a URL to be placed in a corresponding plug-in application menu entry for access by the thin UI client 12 web browser.

Another aspect may include downloading required extension modules. For each of the available plug-in applications, one may download the extension modules as required to the building control device. These modules may be needed for the several scenarios. One scenario may be providing an extension to existing application service in building control device 11. An example of a download extension module may be a replacement of an application data service, which is enhancement provided by merging current data from the building control device 11 (related to time-based or history data such as trend log) with older/archived data from the configured external server (cloud) 14 as part of the plug-in extension.

Another scenario may be providing extensions for those services designed to allow extension through additional registered handlers downloaded from the external server (cloud) 14. An example of this may include those services with inputs specified in a way that are easily recognized by specific handler for which they were intended, like a XML (extensible markup language) document designed to be processed by different registered handlers that recognize the input, and results that are also separated in different sections combined from output of different registered handlers.

The data access service may provide at least the info needed to build the menu entries corresponding to available plug-in applications. Menu builder 25 is part of RIA instead of thin UI, and there's no interaction between RIA and thin UI. For an RIA UI, this may enable the RIA application to read the info and build its menu contents as described relevant to rich UI application 13 herein.

An app X subsystem 32 may provide a specific or related group of application features in the building control device 11. An app X view 37 may be one of the building control device applications' views, e.g., trend log data. An app X configuration may provide an application's configuration service (including a persistent store). It may be an optional component, but typically needed for each building control application feature, e.g., an alarm, trend log, or schedule configuration. App X data 41 may provide an application's processing/data service (including a persistence store). App X data 41 may be an optional component, but typically needed for each building application feature, e.g., alarm history or trendlog history data. App X data archiving 42 may be a part of the application X's feature related to history data archiving. E.g., trend log data older than n days (as an example of an archive period) may be archived in the configured external server. The component app X data archiving 42 may be optionally downloaded in a scalable system solution as part of plug-in apps configuration processing.

The thin UI client (web browser) 12 may be noted. A web page window may correspond to a web browser window with a URL requesting from the building control device web server 16. The content may correspond to a building control device's application (such as graphic display, schedule configuration, trend log view, and so forth) depending on the specific URL. These views may typically have common elements, such as an application tab menu at the top. The application specific views may usually be allocated to a common sub-region, such as below the view's tab menu located at the top portion of the window.

A key part of the solution for scalable embedded building control supervisor may be provided through the "plug-in application" menu provision as described in the "menu builder" component 34 of the building control device's web UI framework 29.

A plug-in configuration may be a component of the thin UI client 12. A plug-in applications sign-up view 22 may be a web page sub-region. This optional view may provide the process of configuring (including payment as applicable) for plug-in application features as available for a building control device 11. This page may be accessed from the thin UI client's menu, which automatically includes the specific building control device's model as inputs for selecting virtually exact available plug-in applications. The page may make the request to the pre-configured URL for accessing the view from the external server (cloud) 14. This view may be a publicly accessible view, because it enables a user to sign up or purchase from available plug-in applications to extend functionality of their building control device 11 only, and not the actual applications. Once the sign-up process is complete, it may provide the user 15 with authentication info needed by the plug-in apps config view 19. (E.g., the authentication info may be either generated from the view directly if online payment is used, or sent via email if offline payment is used instead.)

Plug-in applications configuration view 19 (a web page sub-region) may be noted. The key scope of this view may be to enable a user to configure the building control device 11 to provide access to the list of plug-in applications that user 15 has signed up/purchased. This view may collect parameters from user inputs for the plug-in application configuration subsystem in the building control device 11 to determine its currently active list of licensed plug-in applications. Inputs may include parameters required for communicating with the external server 14 providing the plug-in applications, such as URL and authentication parameters. Related details may be in the information about the plug-in applications sign-up view.

Building control application views may be noted. An app view 21 (a web page sub-region) may display an application's view specific contents, as generated by the corresponding app view 21 from building control device web server 16. A plug-in app X view 18 (web page sub-region) may display the plug-in application X's view specific contents, as generated by the corresponding plug-in app Y view from the external server (cloud) 14.

The following implementation notes may be indicated. To start, in order for this view to work based on the current browser security rule for making request to a different server (i.e., an external server (cloud) 14 rather than a building control device web server 16), the web page sub-region may be allocated to the HTML (hyper text markup language) page's nested IFRAME (inline frame).

Further, for good user experience, the user 15 should not necessarily be prompted to enter authentication info every time the plug-in application view is accessed. One potential solution may be to include authentication info generated from the configuration available in the building control device web server 16, and Javascript code for authenticating with the external server 14 providing the plug-in application view as background pre-processing before a request to open the plug-in application view is made.

The Rich UI application 13 may be noted. An RIA UI shell container 24 may be the window contents of a Rich UI application 13. Container 24 might be embedded inside a web browser plug-in such as via Silverlight or Flash (which may appear as a current popular browser extension for the Rich UI application). Some key aspects of the RIA UI shell container 29 needed to support a plug-in application extension may be indicated. One is that an application menu may have pre-defined or discovered menu entries for opening views for sign-up and configuring plug-in applications as described in similar views in the thin UI client 12 section, and plug-in application views as discovered and created by the menu builder 25.

Another aspect may be an interface for an application view embeddable in the RIA UI shell container's view region which may be defined in order for the plug-in application view to be developed and componentized to be dynamically loaded, and created from a command associated with the menu entry. The list of plug-in application menu entries and associated dynamically loaded modules might be obtained from the web service request to the building control device's plug-in apps configuration 38.

In addition to constructing the application's menu, the menu builder 34 may also include pre-defined menu entries by the server for sign-up and configuring plug-in applications, and plug-in application menu entries in a well-defined menu structure location to enable a user to easily identify and select. A list of plug-in application menu entries might be obtained from the RIA UI shell container 24.

A module loader 28 may dynamically load modules associated with plug-in application views. For example, both Silverlight and Flash may currently have a capability for Rich UI applications based on an architecture to dynamically load application shared libraries or components. Information for loading specific modules might be obtained from the RIA UI shell container 24.

An app view 26 may be one of the normal (i.e., non-plug-in) application views designed for a specific version of a building control device 11. It may be loaded as part of the application's pre-packaged files.

A plug-in app X view 18 may correspond to one of the plug-in application views. It may be dynamically loaded as described in the RIA UI application's module loader 28 and integrated into the application as described in the RIA UI shell container 24. This view might be designed to get its data via the building control device web server 16 and/or external server (cloud) 14.

The thin UI client (web browser) 12 may have a web page window 17 with connections to the plug-in app X view 18, plug-in apps config view 19, app view 21 and plug-in apps sign-up view 22. Rich UI application 13 may have an RIA UI window 23 connected to RIA UI shell container 24. RIA UI shell container 24 may be connected to menu builder 25, app view 26 and plug-in app X view 27.

Building control device web server 16 may have web UI framework 29, plug-in app extension framework 31, and app X subsystem 32 connected to thin UI client 12 and Rich UI application 13. In web UI framework 29, a web UI controller 33 may be connected to menu builder 34. Controller 33 may also be connected to a plug-in apps config view 35 and plug-in app X view 36 of framework 31. Controller 33 may be connected to app X view 37 of app X subsystem 32. Menu builder 34 of framework 29 may be connected to a plug-in apps configuration 38 of framework 31. App X config 39 and app X data 41 of app X subsystem 32 may be connected to thin UI client 12 and Rich UI application 13. App X data archiving 42 of subsystem 32 may be connected to cloud 14 and other servers 20.

External server (cloud) 14 may have an app X plug-in 43 connected to thin UI client 12, Rich UI application 13, and other servers 20, and a plug-in configuration 44 connected to building control device web server 16, thin UI client 12 and Rich UI application 13.

In app X plug-in 43, plug-in app X view 45 may be connected to archive device data/plug-in app X data 46, other data sources 47 and thin UI client 12. Plug-in app X data collection 48 may be connected to archive device data 46, device plug-in apps configuration 49 of plug-in configuration 44 and to other servers 20. Device plug-in apps configuration 49 may be connected to framework 31 of web server 16. Plug-in app configuration 51 may be connected to device plug-in apps configuration 49, plug-in apps database 52, and thin UI client 12.

Other servers 20 may have an email, RSS and other protocol exchange archive data server 53 connected to app X plug-in 43, app X subsystem 32, and other components via, for instance, plug-in app X data collection 48. Various components of system 30 may have connections to web service, Http (hypertext transfer protocol), and so forth.

The external server (cloud) may enable a building control device's available application functionality to be extended and enhanced as selective options for the user of a building control system. A Plug-in Configuration may incorporate the following items. A Plug-in App Configuration may provide functionality for signing up and accessing a current list of configured plug-in applications for a specified building control device. A Plug-in Apps Database may contain a list of plug-in applications available associated with each device category (e.g., a specific device model and version number). This might include actual modules as part of the plug-in modules to be downloaded as part of the Plug-in App Configuration by the remote building control device. A Device Plug-in Apps Configuration may provide persistent configuration of plug-in application licensed/available associated with a building control device identifier (such as device's MAC or other type of manufacturer's assigned host ID).

An App X Plug-in may incorporate the following. A Plug-in App X View may provide enhanced or additional application X's views for building control device, e.g., a trend log data analysis view that gets its data from the external server based on archived trend log data. Other Data Sources may provide additional data for the Plug-in App X View, e.g., for features requiring data analysis and comparison related to energy consumption, the Other Data Sources could provide similar building energy consumption profiles from external data sources for comparison (based on different normalization criteria, similar size, age, and so forth).

Archive Device Data/Plug-in App X Data may provide building control data, possibly designed with a schema that can store data for multiple application features, e.g., they may be archived device data such as trend log or alarm history data. The Archived Device Data could be part of a multi-tenancy server solution, where each building control device's data are treated similar to a tenant in a typical multi-tenancy software design solution. A Plug-in App X Data Collection may be a counter part of App X Data Archiving in the building control device. The key functionality may be to collect and store archive data transferred indirectly through another server (e.g., an Email server). Authorized access info associated with App X Data may be configured through the Plug-in Apps Configuration in the building control device's plug-in app extension framework.

Other servers may be looked to. Email/RSS/Other-protocol Exchange Archive Data Servers may provide a standard mechanism for building control device to transfer data indirectly to the external server (cloud), e.g., archiving trend log data via emailing to an external email server. (One may note that this may appear as part of incremental steps of enhancing the functionality of a Building control embedded device functionality. First, it may be by enabling the user of the system to archive its data to a server like SMTP email server that they already have. If users of the user of the system finds the need to make a user of that archived data easily like viewing or getting additional analysis data, they may sign-up to get access to the optional functionality from the external server (cloud).

A building control device web server may incorporate or involve the following. A Web UI Framework may provide a common framework from which specific views are derived, including common view contents like the web UI page logo, menu, and so forth. (The specific view typically may be rendered in the remaining or allocated main area of the page.) In addition, it may also provide the file request service for serving up requested application modules for the RIA UI Application. A Web UI Controller may provide the typical controller functionality similar to standard MVC pattern. It may process web browser requests (URLs) corresponding to web UI views' requests by dispatching to the view's chained action handlers associated with the specific URL. The result may be an HTML page content as a response to the web browser request. In addition, it may also provide the general file request service for serving up files, including application modules for the RIA UI Application. A Menu Builder may generate the web application view page contents specifically in the region corresponding to the application menu contents. For the scalability system being described, it may contain at least (a) a menu entry for configuring plug-in applications, (b) a list of menu entries corresponding to the plug-in applications available as result of (a). (As part of the MVC framework, it may be typically one of the chained action handlers corresponding to a URL request handlers for a Thin UI Client view.)

A Plug-in App Extension Framework may provide a functionality including views for configuring a list of plug-in applications available for a specified building control device. A Plug-in Apps Configuration View may enable a user to provide inputs related to the external server (cloud) access info (e.g., authentication key, user, and password), which are obtained from the Plug-in Apps Sign-up View output or similar info obtained from purchasing through the Device's manufacturer. A Plug-in Apps Configuration subsystem may provide the functionality for (a) configuring the current device's available plug-in applications based on the inputs from the Plug-in Apps Configuration View, and (b) retrieving a list of active plug-ins available for the current building control devices.

The configuration functionality may be provided through its web service, which supports both Thin UI client and RIA UI. The functionality may incorporate the following key aspects. One may be initializing the list of available plug-in application and access info. The configuration web service may take input parameters related to those required for communicating with the external server providing the plug-in applications, such as URL and authentication parameters. (These parameters for example may be provided as result of the Plug-in Apps Sign-up.) Given the input, the configuration service may request from External server's Device Plug-in Apps Configuration the list of active plug-in applications, and associated info for accessing each of them. (For example, access info could be a URL to be placed in a corresponding plug-in application menu entry for access by the Thin UI Client web browser).

Another aspect may be downloading required extension modules. For each for the available plug-in applications, the extension modules may be downloaded as required to the building control device. These may be needed for the following scenarios. One may be providing extension to existing application service in building control device. An example of a download extension module may be a replacement of an application data service, which enhancement is provided by merging current data from the building control device (related to time-based or history data such as trend log) with older/archived data from the configured external server (cloud) as part of the plug-in extension. Another scenario may involve one providing extensions for those services designed to allow extension through additional registered handlers downloaded from the external server (cloud). An example of this may be those services with inputs specified in a way that easily recognized by specific handler for which it was intended, like a XML document designed to be processed by different registered handlers that recognize the input, and results may also be separated in different sections combined from output of different registered handlers.

The data access service may provide at least the info needed to build the menu entries corresponding to available plug-in applications. For a thin UI client, this may support the Menu Builder (e.g., a menu label and an associated URL as an action of the menu entry), and info for accessing the remote server's plug-in apps when requested from the web UI page. For RIA UI, this may enable the RIA application to read the info and build its menu contents as described in an RIA UI Application herein.

An App X subsystem may provide a specific or related group of application features in the building control device as noted in the following. An App X View may be one of the building control device applications' view; e.g., Trend log data. An App X Configuration may provide an application's configuration service (including a persistent store). It may be an optional component, but typically be needed for each building control application feature; e.g., alarm, trend log, or schedule configuration. App X Data may provide an application's processing/data service (including a persistence store). It may be an optional component, but typically be needed for each building application feature, e.g., alarm history or trendlog history data. App X Data Archiving may be part of the application X's feature related to history data archiving. For example, trend log data older than n days (as an example of an archive period) may be archived in the configured external server. This component could be optionally downloaded in a scalable system solution as part of Plug-in Apps Configuration processing.

A Thin UI Client (web browser) may incorporate the following items. A Web page window may correspond to a web browser window with a URL requesting from a building control device web server. The content may correspond to a building control device's application (such as Graphic Display, Schedule Configuration, Trend log View, and so forth) depending on the specific URL. Virtually all of these views may typically have common elements, such as application tab menu at the top. The application specific views may usually be allocated to a common sub-region, such as below the view's tab menu located at the top portion of the window. A key part of the solution for scalable embedded building control supervisor may be provided through the "plug-in application" menu provision as noted in the "Menu Builder" component of the building control device's web UI framework.

A Plug-in Configuration may incorporate a Plug-in Applications Sign-up View (Web page sub-region). This optional view may provide the process of configuring (including payment as applicable) for plug-in application features as available for a building control device. This page may be accessed from the Thin UI Client's menu, which automatically includes the specific building control device's model as inputs for selecting exact available plug-in applications. The page may make the request to the pre-configured URL for accessing the view from the external server (cloud). This may be a publicly accessible view, because it enables user to sign up or purchase from available plug-in applications to extend functionality of their building control device only, and not necessarily the actual applications. Once the sign up process is complete, it may provide the user with authentication info needed by the Plug-in-Apps Config View. For example, the authentication info may be either generated from the view directly if online payment is used, or sent via email if offline payment is used instead.

Plug-in Applications Configuration View (Web page sub-region) may have a key scope which is to enable a user to configure the building control device to provide access to the list of plug-in applications that user has signed up/purchased. It may collect parameters from user inputs for the Plug-in Application Configuration subsystem in the building control device to determine its currently active list of licensed plug-in applications. Inputs may include parameters required for communicating with the external server providing the plug-in applications, such as URL and authentication parameters. One may note related details in the Plug-in Applications Sign-up View.

Building Control Application Views may be indicated as in the following. An App View (Web page sub-region) may display application X's view specific contents, as generated by the corresponding App X View from building control device web server. A Plug-in App X View (Web page sub-region) may display the plug-in application X's view specific contents, as generated by the corresponding plug-in App X View from the external server (cloud).

Implementation notes incorporate the following. In order for this to work based on current browser security rule for making request to a different server (i.e., an external server cloud rather than building control device web server), this web page sub-region might be allocated to the HTML page's nested IFRAME. For good user experience, a user should not necessarily be prompted to enter authentication info every time the plug-in application view is accessed. One potential solution may be to include authentication info generated from the configuration. available in the building control device web server, and Javascript code for authenticating with the external server providing the plug-in application view as background pre-processing before a request to open the plug-in application view is made.

Rich Client UI items may be indicated as the following. An RIA UI Shell Container may be the window contents of a Rich Client UI. It might be embedded inside a web browser plug-in such as via Silverlight or Flash (each of which is a popular browser extension for Rich Client UI). Following may be some key aspects of this RIA UI Shell Container needed to support a plug-in application extension. An Application menu may have pre-defined or discovered menu entries for opening views for sign-up and configuring plug-in applications as described in similar views in the Thin UI Client section, and Plug-in application views as discovered and created by the Menu Builder. An Interface for application view embeddable in the RIA UI Shell Container's view region may be clearly defined in order for the plug-in application view to be developed and componentized, to be dynamically loaded, and created from command associated with the menu entry. The list of plug-in application menu entries and associated dynamically loaded modules may be obtained from a web service request to the building control device's Plug-in Apps Configuration.

A Menu Builder, in addition to constructing the application's menu, may also include Pre-defined menu entries by the server for sign-up and configuring plug-in applications, and Plug-in application menu entries in a well-defined menu structure location to enable a user to easily identify and select. The list of plug-in application menu entries may be obtained from the RIA UI Shell Container.

An App Module Loader may dynamically load modules associated with plug-in application views. For example, both Silverlight and Flash may have a capability for a Rich Client UI based on its architecture to dynamically load application shared libraries or components. The information for loading specific modules may be obtained from the RIA UI Shell Container.

An App View may be one of the normal (i.e., non-plug-in) application views designed for the specific version of a building control device. It may be loaded as part of the application's pre-packaged files.

A Plug-in App X View may correspond to one of the plug-in application views. It may be dynamically loaded as described in the RIA UI Application's Module Loader and integrated into the application as described in the RIA UI Shell Container. This view may be designed to get its data via the building control device web server and/or external server (cloud).

A Plug-in Application Sign-up and Integration Process may be noted. Diagrams may illustrate the process of signing up plug-in applications and seamless integration of the plug-in applications with support from an external server (e.g., for storage and extended functionality) into a building control device's applications. For details related to the semantics of these diagrams, one may consult a UML reference or UML tool's documentation. One may note the following items.

http://www.sparxsystems.com.au/resources/uml2_tutorial/uml2_sequencediagram.html and/or http://www.sparxsystems.com/resources/uml2_tutorial/uml2_activitydiagram.html.

Figure 4:
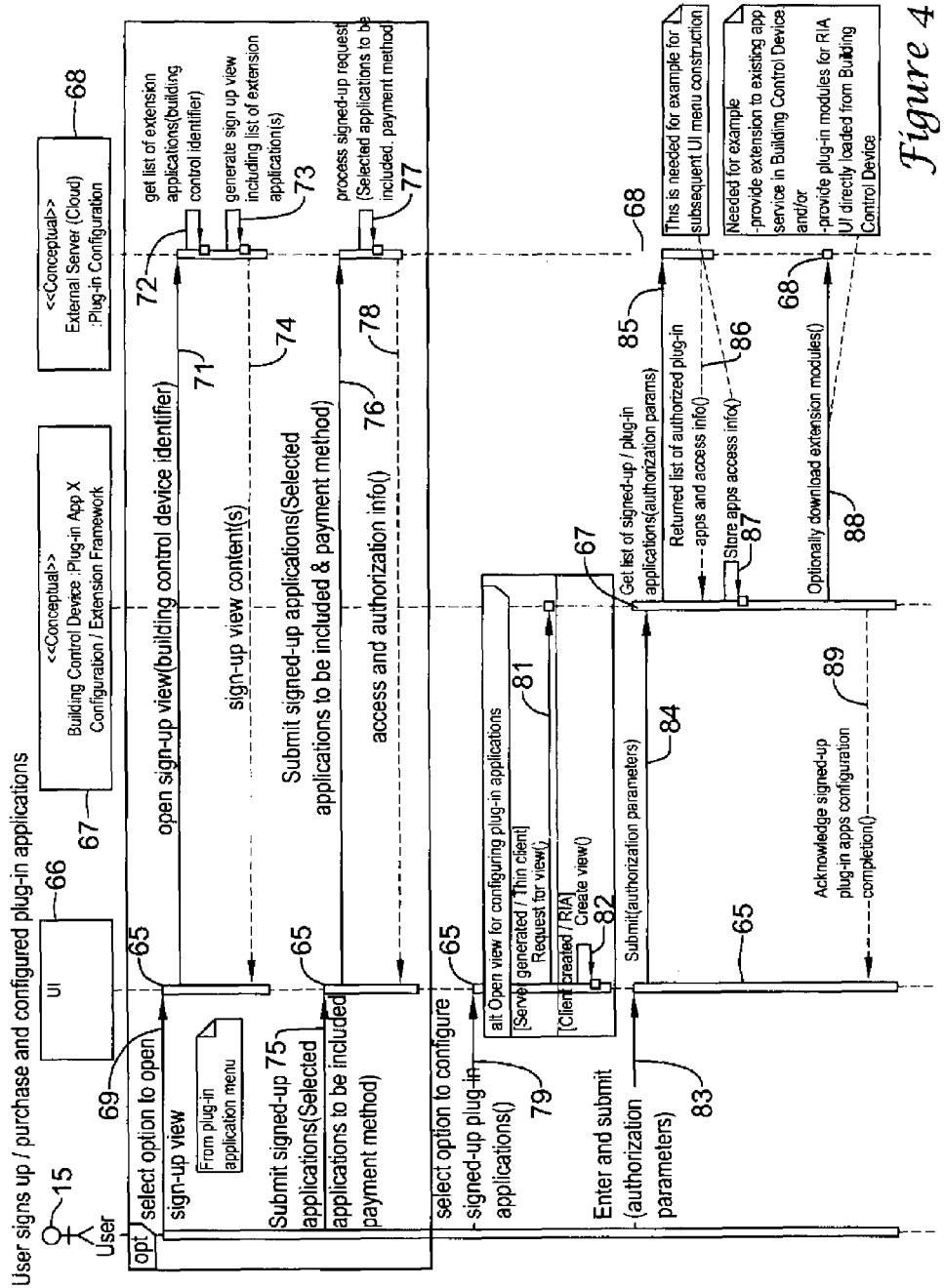
FIG. 4 is a diagram of where a user may sign-up/purchase and configure plug-in applications.

FIG. 4 is a diagram of where a user 15 may sign-up/purchase and configure plug-in applications. The user may select an option to open a sign-up view along line 69 from a plug-in application menu at user interface place 65 at a user interface 66. Then user 15 may open a sign-up view (building control device identifier) along line 71 of building control device plug-in app X configuration/extension framework. At place 68, an external server (cloud) plug-in configuration, user 15 may get a list of extension applications (building control identifier) along line 72 and then may generate a sign up view including the list of extension applications along line 73. Along a return dash line 74 from place 68 to 66 may be sign-up view contents. Along line 75, the user may submit signed-up applications (selected applications to be included, payment method) at place 66. The user may submit signed-up applications (selected applications to be included and payment method) along line 76 from place 66 to place 68. A process signed-up request (selected applications to be included, payment method) may be made by user along line 77 at place 68. From place 68 to place 66 may be access and authorization along dashed line 78 to user interface place 65.

After user has obtained access and authorization info either through online purchase as described in the preceding sign-up step, or obtained via offline purchase method directly through human interaction the user may continue with the sign-up/configuration process as indicated by the following. User 15 may select an option to configure signed-up plug-in applications along line 79 to user interface 65. The user may open a view for configuring plug-in applications with a server generated/thin client request for a view from user interface 65 to place 67 along line 81. Alternatively, the user may open a view for configuring plug-in applications via RIA UI at interface 65 along line 82.

User 15 may then enter and submit authorization parameters along line 83 to interface 65. Authorization parameters may be submitted along line 84 to place 67. The user may get a list of signed-up/plug-in apps and access info along line 85 to place 68. A list of authorized plug-in apps and access info may be provided along dashed line 86 from place 68 to place 67. Apps access info may be stored along line 87 at place 67, which is needed, for example, for subsequent UI menu construction. Extension modules may be optionally downloaded along line 88 from place 67 to place 68. This may be needed, for example, to provide an extension to existing app service in the building control device and/or to provide plug-in modules for an RIA UI directly loaded from the building control device. Along dashed line 89 from place 67 to place 65, the user may get confirmation of signed-up plug-in apps configuration completion.

A user may sign up and configure plug-in applications. The process described by a diagram may be applicable for both Thin UI Client and Rich Client UI. A high-level process flow may incorporate the following steps—Sign-up/purchase plug-in applications and Configure to enable a plug-in application to be integrated.

One may select an option to open a sign-up view. This optional part of the process may be for a user to select and purchase the list of extended applications available for the associated user's building control device. This Sign-up view request may be optional because it might be carried out through an offline purchase process, which may provide the same authorization information to the user for use by a subsequent part of this process.

One may select an option to configure signed-up plug-in applications and Enter/submit authorization parameters. This part of the process may be needed to enable the purchased plug-in applications to be subsequently integrated into the building control device's user interface, for a user accessing them. One may select an option to configure signed-up plug-in applications. For a Thin UI Client, the request may typically result in a view generated by the server. For a Rich Client UI, the view may typically be created by the UI application, e.g., if it was already loaded previously as part of the application loading and initialization. One may enter/submit authorization parameters. The user may enter authorized parameters to access plug-in application modules and other access info from the external server, and subsequently to access application data from the external server.

For ease of sign-up and configuration process, building control device application's UI menu may include entries for access to views described in the previous steps. Those views may be expected to be processed by the external server and building control device, respectively.

Figure 5:
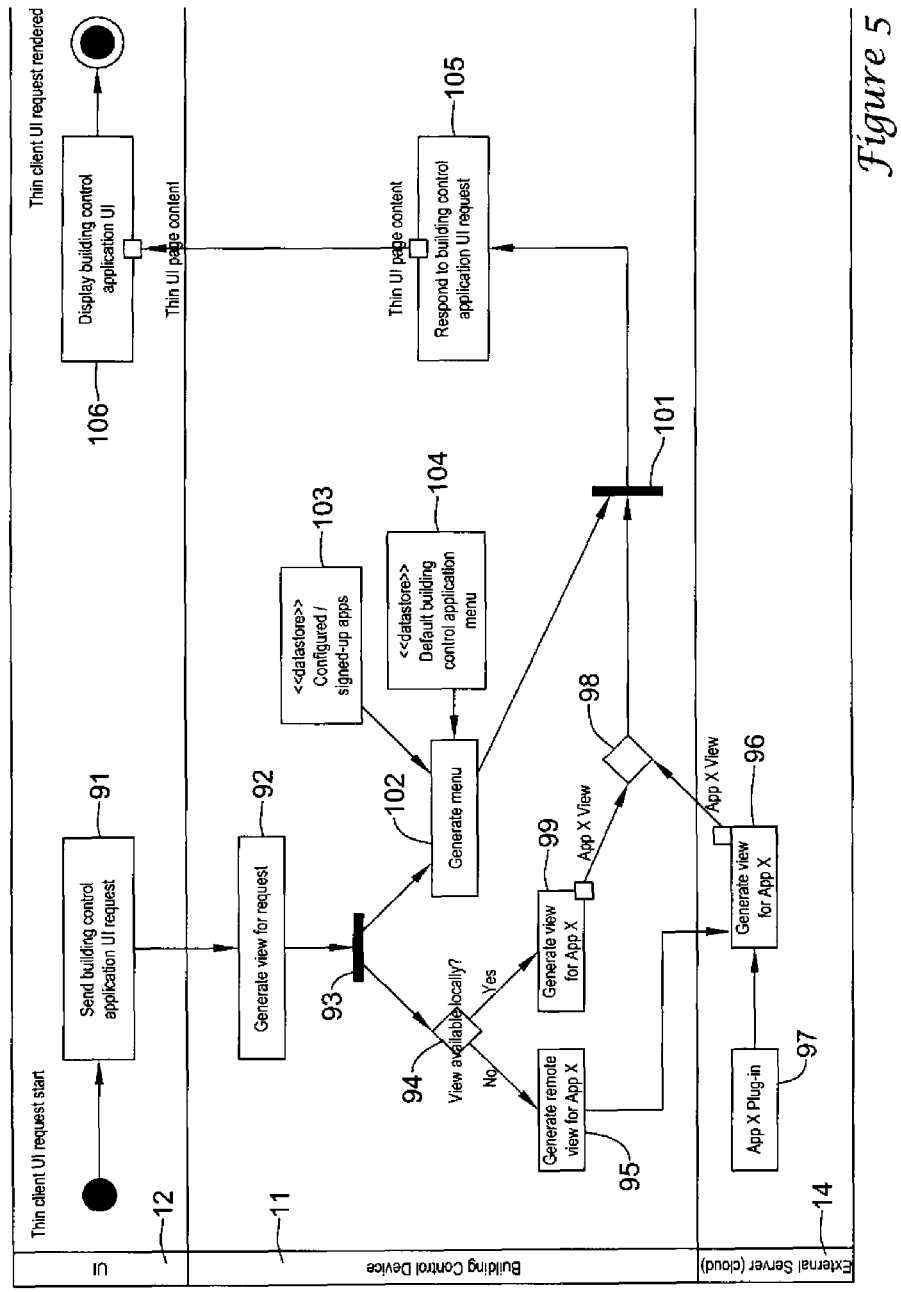
FIG. 5 is a diagram of a thin client user interface request which may start where a building control application user interface request is sent.

FIG. 5 is a diagram of a thin client request which may start at symbol 91 where a building control application user interface request is sent from UI 12. The request may be sent to building control device 11 where a view for the request is generated at symbol 92. The request may then go to a junction 93. From junction 93 to symbol 94, a question is whether the view is available locally. If not, then a remote view for app X may be generated at symbol 95. Access to external server (cloud) 14 may be obtained to generate a view for app X from app X plug-in 97 at symbol 96. App X view may go from symbol 96 to a symbol 98. Returning to symbol 94, if the view is available locally, then a view for app X may be generated at symbol 99. The app X view may go to symbol 98 at the building control device 14. At symbol 98, an app X view from either symbol 96 or symbol 98 may go to a symbol 101.

From symbol 93, with a request to generate the view menu to symbol 102, a view menu may be generated. Symbol 102 may receive configured/signed-up apps from a datastore at symbol 103 and/or a default building control application menu from the datastore at symbol 104. The menu generated at 102 may go to symbol 101. The app X view from symbol 98 and menu from symbol 102 may go from junction or symbol 101 to a symbol 105 as a response to the building control application UI request. From symbol 105, thin UI page content may go to symbol 106 at UI 12 where the building control application is displayed and thus constitute a rendering of the thin client UI request.

One may send a building control application UI request. This could be a URL corresponding to the building control device's home page (which results in a default application view), or a specified application view corresponding to a user-selected menu request. A view for the request may be generated. This view may be requested by "Send building control application UI request" to building control device which generates a view and menu for the thin UI page content. If the view is not an extension/plug-in app, it may be generated locally by the building control device; otherwise, it may be generated by the external server if the building control device implementation does not download the plug-in module to its list of runtime modules during the process of configuring the list signed-up plug-in applications. The result from the first two items, regardless of where the view is generated, may be combined with the menu (including original and plug-in applications) to form the thin UI page content and send it back to the requestor for displaying.

Figure 6:
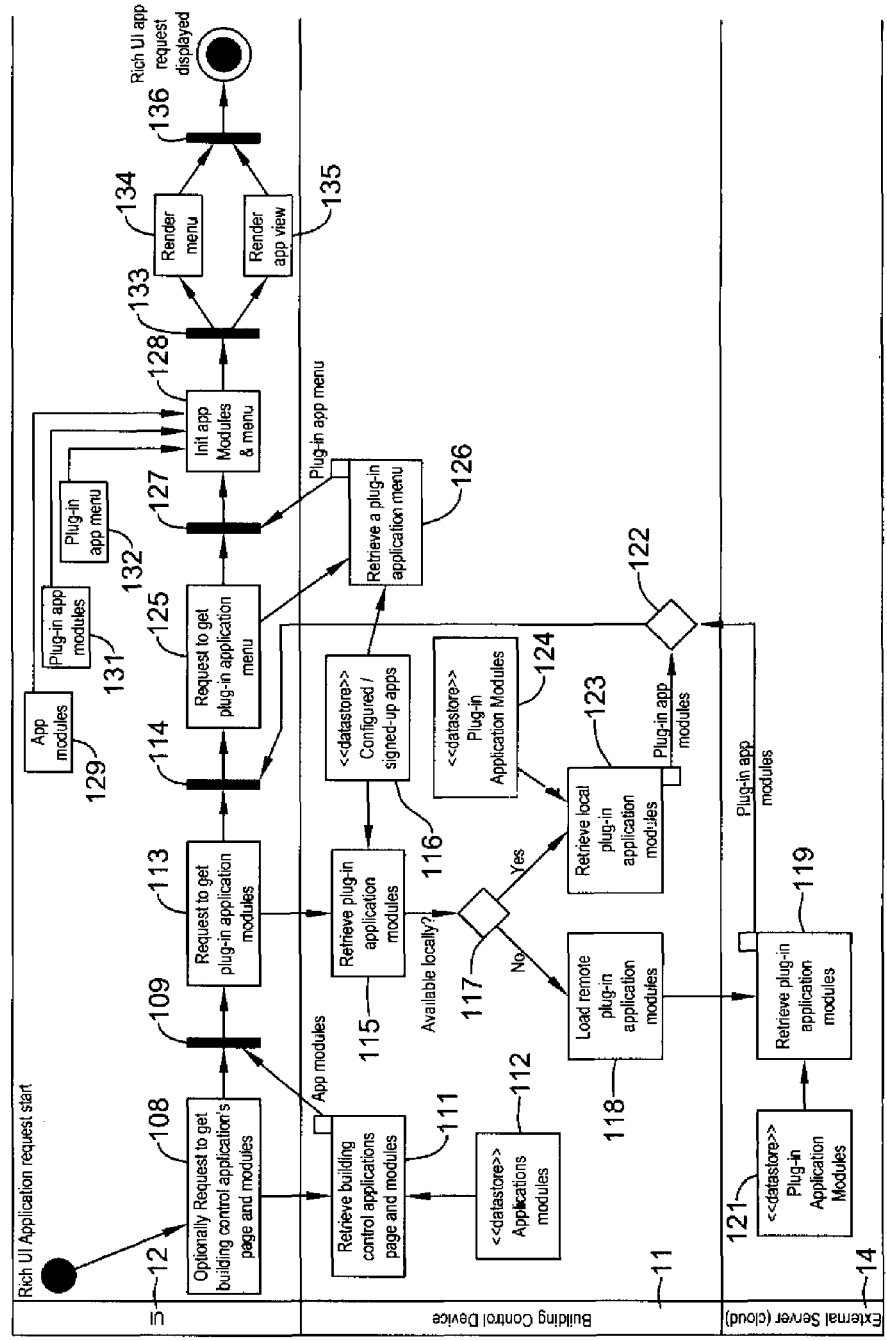
FIG. 6 is a diagram of a rich user interface request which may start where a user may optionally request to get a building control application page and modules.

FIG. 6 is a diagram of a Rich UI application request which may start at symbol 108 where a user 15 may optionally request to get a building control application's page and modules. The request may go to a junction symbol 109 in the UI 12, and to a symbol 111 in the building control device 11. The building control application's page and modules may be retrieved at symbol 111. Retrieval of application's modules of a datastore may be made from symbol 112 to symbol 111. Application modules may go from symbol 111 to symbol 109. The items at junction or symbol 109 may go to symbol 113 which formulates a request to get plug-in application modules. This request may go to a junction or symbol 114 in UI 12 and to symbol 115 in building control device 11. At symbol 115, plug-in application modules may be retrieved. Configured/signed-up applications may be provided at symbol 116 from the datastore to symbol 115. The retrieval at symbol 115 may in a form of a question at a symbol 117 which is whether the plug-in application modules are available locally. If not, then remote plug-in application modules may be loaded at symbol 118. From symbol 118, plug-in application modules may be retrieved at symbol 119, in external server 14, from a datastore having plug-in application modules at symbol 121. Plug-in application modules may go from symbol 119 to a symbol 122 in building control device 11.

If an answer to the question at symbol 117 is yes, then local plug-in application modules may be retrieved at symbol 123 from symbol 124 where the plug-in application modules are obtained from the datastore. Plug-in application modules may then be provided from symbol 123 to symbol 122. Whether the modules are from symbol 119 or 123, plug-in application modules may be provided from symbol 122 to junction or symbol 114 in UI 12.

Plug-in application modules at symbol 114 may lead to a request to get a plug-in application menu at symbol 125. This request may go to a symbol 126 in building control device 11 where a plug-in application menu is to be retrieved. Configured/signed-up applications may be obtained from symbol 116. A plug-in application menu may then go from symbol 126 to a junction or symbol 127. Plug-in application modules may go from symbol 125 to symbol 127. From symbol 127, plug-in application modules and the plug-in application menu may go to a symbol 128, where the application modules and menu may be initiated. Symbols 129, 131 and 132 may provide application modules, plug-in application modules and a plug-in application menu, respectively to symbol 128. Items from symbol 128 may go to a symbol 133 where a menu and an application view may be rendered, as indicated by symbols 134 and 135, respectively. Thus, the Rich UI application request may be displayed at symbol 136.

One may make a request to get building control application's page and modules. This may typically be done for a Rich Client UI hosted in a web browser, such as a Silverlight or Flash-based application, which is loaded from the server based on user request to access the application from a specified URL. For another type of Rich Client UI where it is launched outside of a web browser, this step might not be needed, as the initial application code may already exist in the launching host (e.g., a PC).

One may request to get plug-in application modules, and init app modules and menu. This may occur as part of the processing of the Rich Client UI's Plug-in App X Configuration/Extension Framework to integrate plug-in applications in addition to the original applications designed to be a native part of the building control device's applications. The plug-in applications are not necessarily required to be hosted inside the building control device as described further herein.

One may render a menu and render an app view. These may be parts of typical processing of a Rich Client UI for displaying its view contents and menu for navigation.

A building control device's processing requests from UI listed in the step noted here may be as follows. One may request to get building control application's page and modules. This may be processed similar to a typical web page request. The result page's content may include logic (e.g., Javascript) for loading the plug-in Rich UI Applicable enabled components (e.g., Siverlight or Flash) into a hosted web browser and initial application module(s). The module(s) may typically be requested as a separate step following the initial page.

One may request to get plug-in application modules. This may be one of the key parts of the approach for integrating building control device's plug-in applications to include extension functionality from an external server and/or enhanced UI. An actual solution for this process could be one of the following variations. A client may make a single request, and building control device may return a single file as a package of virtually all plug-in modules. The client may uncompress the packages to get individual modules. A client may make multiple requests, starting with a request to get the list of plug-in modules then followed by separate request to retrieve each of the plug-in module names from the returned list. The building control device could process the requests from clients described in the preceding two steps by retrieving the modules: (a) directly in its device if its implementation loads into its device those plug-in modules during the signed-up configuration process; and (b) indirectly from the configured external server (cloud) if its implementation does not store those modules directly possibly due to a space constraint.

To Init app modules and menu may be another part of the approach for integrating building control device's plug-in applications from an external server. An actual solution for this process could vary but include the following essential operations: Each plug-in module may be invoked to be initialized, based on a pre-defined interface defined by the Rich Client UI's integration frame work, e.g., Plug-in App X Configuration/Extension Framework described in a conceptual view. The menu entries or navigation links corresponding to the plug-in applications may be obtained and integrated into the Rich Client UI's menu or navigation user interface. For example, the menu could be discovered by the Plug-in App X Configuration/Extension Framework based on its defined interface such as specifically named resource files appeared in each of the plug-in module, or separately requested to be loaded from the server.

Figure 7:
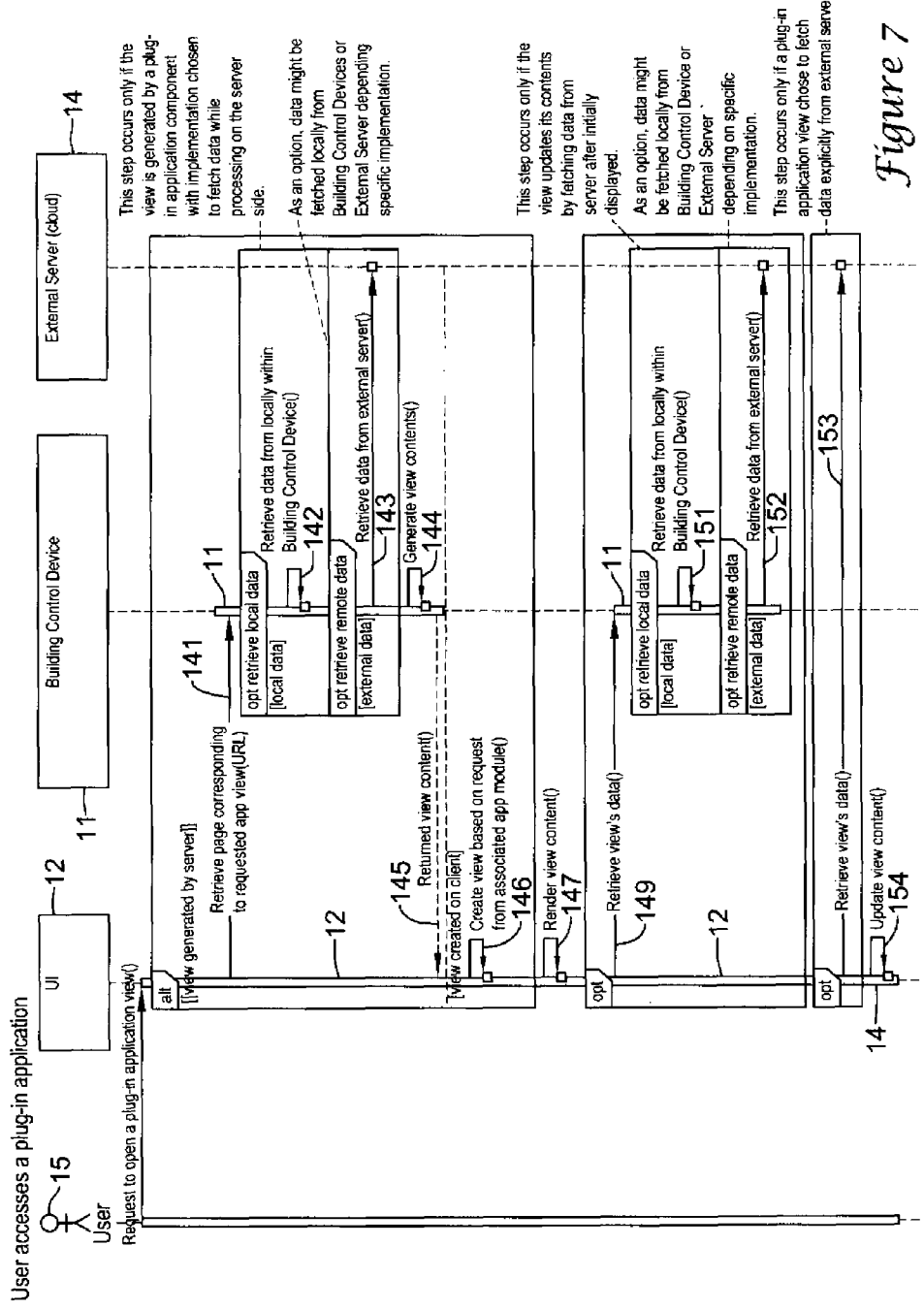
FIG. 7 is a diagram that involves a request to open a plug-in application view.

FIG. 7 is a diagram that involves a request to open a plug-in application view. The request may be made by user 15 to open a plug-in application view. The view may be generated by a server at a user interface 12. User interface 12 may refer to both thin and rich clients. A page corresponding to a requested application view (URL) may be retrieved along a line 141 from a UI 12 place to a building control device (BCD) 11 place. Along a line 142 at the BCD 11 place, data may be retrieved locally within BCD 11. This step may generally occur only if the view is generated by a plug-in application component with an implementation chosen to fetch data while processing on a server side. Along a line 143 from the BCD 11 place to an external server (cloud) 14 place, the data may be remotely retrieved from the external server 14. As an option, data might be fetched locally from BCD 11 or external server 14, depending on a specific implementation. After being retrieved of the data, view contents may be generated along line 144 at the BCD 11. The view contents may be returned to or provided to the UI 12 place along a dashed line 145. Rather than the view being generated by a server, the view may be created along a line 146 on the client at UI 12 place, based on a request from an associated application module. The view content may be rendered along line 147 at the UI 12 place.

A view's data may be retrieved along a line 149 from the UI 12 place to the BCD 11 place. The view's data may be retrieved locally within the BCD 11 along a line 151. This step may generally occur only if the view updates its contents by fetching data from a server after initially being displayed. The view's data may be retrieved remotely from an external data along a line 152 from the BCD 11 place to the external server 14 place. As an option, data may be fetched locally from BCD 12 or external server 14, depending on a specific implementation.

The view's data may be retrieved along a line 153 from the UI 12 place to the external server 14 place. This step may occur only if a plug-in application view is to fetch data explicitly from external server 14. The view content may be updated along a line 154 at the UI 12 place.

The process described by the diagram may be applicable for both the Thin UI Client and Rich Client UI. When a plug-in application is accessed (e.g., through a menu selection), the plug-in application view could be retrieved from the building control device server as one of the possible alternative solutions, as typically used by a Thin UI Client solution. Data may also be typically fetched as part of the view content being generated in the building control device server in this case. The exact method of data retrieval method used by the view could vary in this case depending on the plug-in application, which might load data from the building control device (e.g., if the plug-in application primarily provides an enhanced user interface), or load data from an external server. Alternatively, the view could be created by the UI application instead of generated from a request to a building control device server; e.g., if it was already loaded previously as part of the application loading and initialization.

View content could be updated after it is initially displayed. Similarly, the data in this case could be retrieved through a request from the plug-in application on the UI side to the building device server (which could then return data fetched directly in its device or indirectly from a configured external server as described in a second step). Alternatively, some plug-in application could choose to request for data retrieval directly to the external server. Similarly, the process of updating the data (instead of reading), which is not shown in the above diagram, could be made from a UI to the building control device or to the external server.

To recap, a system for accommodating a building control device may incorporate a user interface, a building control device connected to the user interface and an external server connected to the building control device. The external server may be for extending capability of the building control device. There may also be a mechanism for accommodating plug-in applications. The plug-in applications may be seamlessly integrated into the building control device through the external server.

A plug-in application may require optional authorization, if selected. The plug-in application may be obtained for integration into the user interface for the building control device. Parameters may be entered to access plug-in application modules via the external server. The seamless integration may be such that a user of the system would not notice the integration Obtaining a plug-in application may further involve downloading code and/or data. The downloading may occur from the external server to the building control device.

Integrating and presenting available plug-in applications via a thin client user interface may incorporate requesting a view of an application of the building control device through a thin client user interface, receiving the view of the application, menu and/or navigation links to plug-in applications displayed at the thin client user interface. The view may be generated by the building control device or the external server.

Integration and presentation of plug-in applications via a rich client user interface incorporate requesting plug-in application modules through a rich client user interface. The request may be processed by the building control device and proxied to the external server if the building control device does not have the plug-in application modules in storage.

A user access of plug-in applications may incorporate retrieving a plug-in application view including data via the user interface. Data may be fetched from the building control device or the external server. The user interface may be of a thin client or rich client type.

A system for accommodating a building control device with extended application functionality may have a user interface, a building control device connected to the user interface, and an external server connected the user interface. The external server may seamlessly integrate one or more plug-in applications into the building control device.

The one or more plug-in applications may provide enhanced and additional views of data for the building control device. The external server may further incorporate a plug-in application for extending functionality for the building control device. The building control device may provide a mechanism to archive and/or retrieve information from a server to extend effective memory capacity of the building control device.

The building control device web server may involve a web user interface network connected to the user interface, a plug-in application extension framework connected to the web user interface network, the user interface, and the external server. There may also be an application subsystem connected to the web user interface network and the user interface.

The external server may incorporate a plug-in application connected to the user interface and a plug-in configuration connected to the plug-in application and the building control device web server. The external server may provide virtual computing for the building control device.

The external server may provide access to long-term history data for diagnostics, system performance analysis and/or fault detection analysis. The access to long-term history data for diagnostics, system performance analysis and fault detection analysis may keep the physical footprint of the building control device as an embedded device from increasing due to needed storage and computational functionality for long-term history data for diagnostics, system performance analysis and fault detection analysis. The building control device may be an embedded building control device with a web enabled interface.

An approach for extending functionality of a building control device may incorporate accessing an external server, selecting an added functionality, optionally obtaining an authorization for the added functionality, and downloading a plug-in application and/or configuration data which will provide the added functionality. The plug-in application may be seamlessly integrated into the user interface experience and/or operation of a building control device. An authorization for the added functionality may involve providing compensation.

An authorization relative to a system may also or instead consist of verifying hardware and/or software configuration of the system, entering an authorization code for the system provided through an e-mail, entering an authorization code as an authorization key printed on a card mailed to a user of the system, verifying a user of the system, verifying user credentials, and/or verifying that a previously distributed authorization key is validated by a valid maintenance contract or support account associated with the system. There may also be other forms of authorization.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A system for accommodating a building control device, comprising:
   a user interface;
   a building control device comprising memory and connected to the user interface;
   an external server connected to the building control device; and
   a mechanism for accommodating plug-in applications; and wherein:

the external server is for extending capability of the building control device;
obtaining a plug-in application comprises:
   downloading code and/or data; and
   wherein the downloading occurs from the external server to the building control device;
integrating and presenting available plug-in applications via a thin client user interface comprise:
   requesting a view of an application of the building control device through a thin client user interface; and
   receiving the view of the application, menu and/or navigation links to plug-in applications displayed at the thin client user interface; and
   wherein the view is generated by the building control device or the external server;
a user access of plug-in applications comprises:
   retrieving a plug-in application view including data via the user interface;
   selecting the plug-in application of the plug-in application view for downloading to the building control device from the user interface;
   downloading the selected plug-in application to the building control device; and
   installing the selected plug-in application on the building control device; and
   wherein:
      the data are fetched from the building control device or the external server; and
      the user interface is of a thin client type;
plug-in applications are seamlessly integrated into the building control device through the external server;
obtaining a plug-in application further comprises:
   providing optional authorization, if selected, to obtain a plug-in application;
   configuring the plug-in application for integration into the user interface for the building control device; and
   entering parameters to access plug-in application modules via the external server;
integration and presentation of plug-in applications via a rich client user interface comprise:
   requesting plug-in application modules through a rich client user interface; and
   wherein the requesting is processed by the building control device and proxied to the external server if the building control device does not have the plug-in application modules in storage.

2. A system for accommodating a building control device with extended application functionality, comprising:
a user interface;
a building control device connected to the user interface; and
an external server comprising a processor and connected to the user interface; and
wherein:
the external server seamlessly integrates one or more plug-in applications into the building control device;
obtaining a plug-in application comprises:
   downloading code and/or data; and
   wherein the downloading occurs from the external server to the building control device;
the building control device provides a mechanism to archive and/or retrieve information from a server to extend effective memory capacity of the building control device;
the building control device web server comprises:
   a web user interface network connected to the user interface;
   a plug-in application extension framework connected to the web user interface network, the user interface, and the external server; and
   an application subsystem connected to the web user interface network and the user interface;
a user access of plug-in applications comprises:
   retrieving a plug-in application view including data via the user interface;
   selecting the plug-in application of the plug-in application view for downloading to the building control device from the user interface;
   downloading the selected plug-in application to the building control device; and
   installing the selected plug-in application on the building control device;
   wherein:
      the data are fetched from the building control device or the external server; and
      the user interface is of a thin client type;
the one or more plug-in applications provide enhanced and additional views of data for the building control device;
the external server further comprises a plug-in application for extending functionality for the building control device;
wherein the external server comprises:
   a plug-in application connected to the user interface; and
   a plug-in configuration connected to the plug-in application and the building control device web server;
the external server provides virtual computing for the building control device;
the external server provides access to long-term history data for diagnostics, system performance analysis and/or fault detection analysis;
the access to long-term history data for diagnostics, system performance analysis and fault detection analysis keeps the physical footprint of the building control device as an embedded device from increasing due to needed storage and computational functionality for long-term history data for diagnostics, system performance analysis and fault detection analysis; and
the building control device is an embedded building control device with a web enabled interface.

* * * * *